Patented Sept. 21, 1943

2,330,129

UNITED STATES PATENT OFFICE 2,330,129

REFRACTORY MATERIAL

Albert Reginald Lucas and William George Wagner, North Acton, London, England, assignors to P. B. Sillimanite Company Limited, London, England No Drawing. Application February 28, 1940, Serial No. 321,340. In Great Britain February 10, 1939

14 Claims. (Cl. 117—70)

This invention relates to refractory materials and to the treatment of refractory materials and more particularly highly porous fire bricks and furnace settings formed of such bricks.

The employment of highly porous fire bricks as furnace linings presents advantages in view of their poor heat conducting capacity. On the other hand, the porosity of the bricks gives rise to difficulties due to their becoming impregnated with carbon and to the action of moisture where the furnaces are allowed to stand idle or where it may be desirable to subject their surface to the action of steam for removing soot.

Compositions are known which may be applied to the surface of the bricks in order that the surface may be rendered impermeable to gases and vapours but in the ordinary way the application of such compositions in a layer of any appreciable thickness such as would render the surface thereof impervious, will result in the composition blistering and even pulling away the surface of the brick and thus destroying the furnace lining or other structure in which the bricks are used.

By coating the surfaces of the bricks directly with a composition which provides a relatively more porous layer, the porosity of the brick is not sufficiently reduced and, moreover, difficulty may be experienced in effecting a connection between the coating and the brick.

The invention is based upon the observation that by the application to the surface of the brick of a composition consisting of refractory material in a fine state of division, and of a grading which will yield substantially no voids when the material, by the employment of a suitable adhesive which may function to some extent as a flux or fritting agent, is consolidated by the action of heat so as to form on the surface of the bricks a very thin substantially non-porous layer, and the application to the treated surfaces of a mixture comprising refractory material in a relatively coarse state of division, and of such character as to yield a relatively porous structure, though a structure much less porous than the body of the brick.

The invention consists, broadly, in the method of treating the surfaces of refractory bodies employed as furnace liners or the like, and more particularly such as possess a highly porous character, which comprises applying to the surfaces thereof, which would otherwise be exposed, a relatively thin layer of finely divided refractory material in association with suitable fritting or fluxing agents, and of a character adapted, if applied of the requisite thickness, to yield a substantially non-porous coating, and thereafter applying to the treated surface a relatively thick coating of a composition containing refractory material, in a state of sub-division such that after heating to a relatively high temperature and, for instance, a temperature normally obtaining in the furnace, the layer formed thereby remains porous.

The character of the refractory material used may be varied within relatively wide limits and the two layers or coatings need not necessarily be of the same general composition. The composition of the second layer or coating may be varied to meet the desired physical conditions in the furnace and the nature of the chemical contacts met in practice.

It may, for instance, consist of an aluminium silicate preferably the material known as P. B. sillimanite, mullite or the like aluminium silicate of low coefficient of expansion having approximately the following composition, the silica being in combination with the alumina:

| | Per cent |
|---|---|
| Alumina ($Al_2O_3$) | 65.52 |
| Silica ($SiO_2$) | 31.07 |

Where the P. B. sillimanite coating contacts, e. g. with a ferruginous slag, a proportion (say 15%) of green oxide of chromium may be added to increase its resistance to attack.

Other refractory materials and, for instance, the material known under the name of "Alundum" or chromite or magnesite or relatively pure silica, ganister or the like may be used.

Any usual fluxes or fritting agents may be employed; conveniently silicate of soda and a proportion of ball or other clay may be included in the composition to facilitate setting or consolidation or adhesion.

The refractory material in the first-mentioned of these compositions may comprise a proportion of material substantially all of which passes a sieve having 200 holes per linear inch and is retained on a sieve having 300 holes per linear inch in association with a substantially larger proportion of refractory material of which 75 per cent. passes through a sieve having 150 holes per linear inch.

The refractory material in the second composition may be in such a state of division that about 40 per cent. passes a sieve having 100 holes per linear inch and that it contains a relatively large proportion of coarser particles which are retained on a sieve having 60 holes per linear inch.

At this point it may be mentioned that this second-mentioned composition is novel and that the invention extends to the composition in question and more particularly the composition in question for use in carrying out the treatment of refractory materials and, for instance, highly porous firebricks and furnace settings formed of such bricks.

Thus, in accordance with the invention, the refractory material, in the first-mentioned composition, may be material of which 99 per cent.

passes a 200 mesh sieve in the proportion of 17 parts by weight of such material which may be referred to as grade "A" relatively to 60 parts by weight of the greater proportion of which material passes a 150 mesh sieve and having the following grading which may be referred to as grade "B":

| | Per cent |
|---|---|
| Retained on a 50 mesh sieve | 1 |
| Passing a 50 mesh sieve and retained on a 100 mesh sieve | 11 |
| Passing a 100 mesh sieve and retained on a 150 mesh sieve, the balance passing a 150 mesh sieve | 13 |

The refractory material in the second-mentioned composition may have the following physical characteristics:

| | Per cent |
|---|---|
| Retained on a 20 mesh sieve | 10 |
| Passing a 20 mesh sieve and retained on a 30 mesh sieve | 14 |
| Passing a 30 mesh sieve and retained on a 60 mesh sieve | 26 |
| Passing a 60 mesh sieve and retained on an 80 mesh sieve | 9 |
| Passing an 80 mesh sieve and retained on a 100 mesh sieve | 2 |

39% passing a 100 mesh sieve. This material may be referred to as grade "C."

In all instances, the sieves referred to are I. M. M. standard screens having the stated number of holes per linear inch.

As an adhesive or fluxing or fritting agent there may be employed in both of these compositions a mixture of ball clay and silicate of soda, the proportion of ball clay relatively to the refractory material being in the first-mentioned composition greater than in the second-mentioned composition.

For instance, the first-mentioned composition may consist of 17 parts by weight of P. B. sillimanite grade "A" as described above.

P. B. sillimanite, grade "B"

| | parts by weight | 17 |
|---|---|---|
| Ball clay | do | 14½ |
| Silicate of soda of the C. 140 grade manufactured by Imperial Chemical Industries | do | 19 |
| Water | parts | 1¾ |

The second-mentioned composition may consist of:

P. B. sillimanite, grade "C"

| | parts by weight | 94 |
|---|---|---|
| Ball clay | do | 7½ |
| Silicate of soda, of the C. 140 grade | do | 5½ |
| Water | parts | 5 |

The first-mentioned composition is applied after the addition of a further proportion of water if necessary in the form of a slurry, that is to say, a slurry so thin that it will just run off from a stick when dipped into it and removed.

The object of this first coat is to seal the surface pores of the brick and to prevent the moisture in the coating subsequently applied being sucked into the substance of the brick. According to the absorptive properties of the brick one or more first layer or coating may be applied. If more than one then the first should be allowed to dry before the application of the second.

The second-mentioned composition is applied as a paste while the layer of the composition first applied is still moist, the second-mentioned composition being applied with a trowel or the like, and being smoothed or pressed onto and into the surface.

Drying and firing can take place at once, assuming that the coating of the second-mentioned composition has been appropriately applied, as it is of such a character that it will not exhibit surface cracks in the drying and firing, nor will it blister.

We claim:

1. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of sub-division adapted after firing to yield a substantially porous outer layer.

2. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of sub-division adapted after firing to yield a substantially porous outer layer the said refractory material being an aluminium silicate of low coefficient of expansion having approximately the following composition, the silica being in combination with the alumina:

| | Per cent |
|---|---|
| Alumina (Al$_2$O$_3$) | 65.52 |
| Silica (SiO$_2$) | 31.07 |

3. The method of treating the surfaces of refractory bodies employed as furnace liners which comprises applying to the surfaces thereof, which would otherwise be exposed, a thin layer of finely divided refractory material in association with a binding agent adapted to yield a substantially non-porous refractory coating and thereafter applying to the surface of this layer a thicker coating of a composition containing refractory material in a coarser state of sub-division in association with a binding agent adapted after firing to yield a substantially porous outer layer.

4. The method of treating the surfaces of refractory bodies employed as furnace liners which comprises applying to the surfaces thereof, which would otherwise be exposed, a thin layer of finely divided refractory material in association with silicate of soda adapted to yield a substantially non-porous refractory coating and thereafter applying to the surface of this layer a thicker coating of a composition containing refractory material in a coarser state of sub-division in association with silicate of soda adapted after firing to yield a substantially porous outer layer.

5. The method of treating the surfaces of refractory bodies employed as furnace liners which comprises applying to the surfaces thereof, which would otherwise be exposed, a thin layer of finely divided refractory material in association with ball clay adapted to yield a substantially nonporous refractory coating and thereafter applying to the surface of this layer a thicker coating of a composition containing refractory material in a coarser state of sub-division in association with ball clay adapted after firing to yield a substantially porous outer layer.

6. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of subdivision adapted to yield a substantially porous outer layer the refractory material in the composition first applied comprising a proportion of material substantially all of which passes a sieve having 200 holes per linear inch and is retained on a sieve having 300 holes per linear inch in association with a substantially larger proportion of refractory material in which 75 per cent. passes through a sieve having 150 holes per linear inch.

7. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of subdivision adapted after firing to yield a substantially porous outer layer the refractory material in the composition applied in the second stage being in such a state of division that about 40 per cent. passes a sieve having 100 holes per linear inch and that it contains a relatively large proportion of coarser particles which are retained on a sieve having 60 holes per linear inch.

8. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of subdivision adapted to yield a substantially porous outer layer the refractory material in the composition first applied comprising a proportion of material substantially all of which passes a sieve having 200 holes per linear inch and is retained on a sieve having 300 holes per linear inch in association with a substantially larger proportion of refractory material in which 75 per cent. passes through a sieve having 150 holes per linear inch, the refractory material in the composition applied in the second stage being in such a state of division that about 40 per cent. passes a sieve having 100 holes per linear inch and that it contains a relatively large proportion of coarser particles which are retained on a sieve having 60 holes per linear inch.

9. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of sub-division adapted after firing to yield a substantially porous outer layer, the composition first applied being material of which 99 per cent. passes a 200 mesh sieve in the proportion of 17 parts by weight of such material relatively to 60 parts by weight of material the greater proportion of which passes a 150 mesh sieve and having the following grading:

| | Per cent. |
|---|---|
| Retained on a 50 mesh sieve | 1 |
| Passing a 50 mesh sieve and retained on a 100 mesh sieve | 11 |
| Passing a 100 mesh sieve and retained on a 150 mesh sieve, the balance passing a 150 mesh sieve | 13 |

10. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a coating of a composition containing refractory material in a coarser state of sub-division adapted after firing to yield a substantially porous outer layer, the refractory material in the second composition having the following physical characteristics:

| | Per cent. |
|---|---|
| Retained on a 20 mesh sieve | 10 |
| Passing a 20 mesh sieve and retained on a 30 mesh sieve | 14 |
| Passing a 30 mesh sieve and retained on a 60 mesh sieve | 26 |
| Passing a 60 mesh sieve and retained on an 80 mesh sieve | 9 |
| Passing an 80 mesh sieve and retained on a 100 mesh sieve | 2 |
| Passing a 100 mesh sieve | 39 |

11. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of sub-division adapted after firing to yield a substantially porous outer layer, the composition first applied being material of which 99 per cent. passes a 200 mesh sieve in the proportion of 17 parts by weight of such material relatively to 60 parts by weight of material the greater proportion of which passes a 150 mesh sieve and having the following grading:

| | Per cent |
|---|---|
| Retained on a 50 mesh sieve | 1 |
| Passing a 50 mesh sieve and retained on a 100 mesh sieve | 11 |
| Passing a 100 mesh sieve and retained on a 150 mesh sieve, the balance passing a 150 mesh sieve | 13 | the refractory material in the second composition having the following physical characteristics:

| | Per cent |
|---|---|
| Retained on a 20 mesh sieve | 10 |
| Passing a 20 mesh sieve and retained on a 30 mesh sieve | 14 |
| Passing a 30 mesh sieve and retained on a 60 mesh sieve | 26 |
| Passing a 60 mesh sieve and retained on an 80 mesh sieve | 9 |
| Passing an 80 mesh sieve and retained on a 100 mesh sieve | 2 |
| Passing a 100 mesh sieve | 39 |

12. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of sub-division adapted after firing to yield a substantially porous outer layer, the composition first applied consisting of 60 parts by weight of P. B. sillimanite grade "A"

P. B. sillimanite, Grade "B"

| | |
|---|---|
| parts by weight | 17 |
| Ball clay do | 14½ |
| Silicate of soda of the C. 140 grade manufactured by Imperial Chemical Industries do | 19 | with the addition of,

Water _____ parts__ 1¾

13. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of sub-division adapted after firing to yield a substantially non-porous outer layer, the composition applied in the second stage consisting of:

P. B. sillimanite, grade "C"

| | |
|---|---|
| parts by weight | 94 |
| Ball clay do | 7½ |
| Silicate of soda, of the C. 140 grade do | 5½ | with the addition of,

Water _____ parts__ 5

14. The method of treating the surfaces of refractory bodies employed as furnace liners which comprises applying to the surfaces thereof, which would otherwise be exposed, a thin layer of finely divided refractory material adapted to yield a substantially non-porous refractory coating and thereafter applying to the surface of this layer a thicker coating of a composition containing refractory material in a coarser state of subdivision adapted after firing to yield a substantially porous outer layer, the composition first applied consisting of 60 parts by weight of P. B. sillimanite grade "A"

P. B. sillimanite, Grade "B"

| | |
|---|---|
| parts by weight | 17 |
| Ball clay do | 14½ |
| Silicate of soda of the C. 140 grade manufactured by Imperial Chemical Industries do | 19 | with the addition of,

Water _____ parts__ 1¾

ALBERT REGINALD LUCAS.
WILLIAM GEORGE WAGNER.